(12) United States Patent
Chigasaki et al.

(10) Patent No.: US 6,672,330 B2
(45) Date of Patent: Jan. 6, 2004

(54) VALVE BONDED WITH CORROSION AND WEAR PROOF ALLOY AND APPARATUSES USING SAID VALVE

(75) Inventors: Mitsuo Chigasaki, Tokyo (JP); Shizuo Matsushita, Tokyo (JP); Jiro Kuniya, Tokyo (JP); Yoshihisa Kiyotoki, Tokyo (JP); Takahiko Kato, Tokyo (JP); Yoshiteru Chiba, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 123 days.

(21) Appl. No.: 09/775,792

(22) Filed: Feb. 5, 2001

(65) Prior Publication Data
US 2001/0017906 A1 Aug. 30, 2001

(30) Foreign Application Priority Data
Feb. 4, 2000 (JP) .......................... 2000-032796

(51) Int. Cl.$^7$ .......................... G12C 15/00; G12C 9/00
(52) U.S. Cl. ...................... 137/375; 251/368; 376/352; 252/62.3 C; 148/648; 228/193
(58) Field of Search ................ 376/352; 137/375; 251/368; 252/62.3 C; 228/193, 194, 195; 148/648

(56) References Cited

U.S. PATENT DOCUMENTS

| | | | | |
|---|---|---|---|---|
| 4,318,733 A | * | 3/1982 | Ray et al. ................. 420/101 |
| 4,493,812 A | * | 1/1985 | Christiansen et al. ....... 376/352 |
| 4,734,968 A | * | 4/1988 | Kuroishi et al. ............. 419/27 |
| 4,754,950 A | | 7/1988 | Tada et al. |
| 4,803,045 A | * | 2/1989 | Ohriner et al. ............... 420/57 |
| 5,280,506 A | * | 1/1994 | Yamada et al. ............ 376/210 |
| 5,633,094 A | | 5/1997 | Takeshima |
| 5,651,842 A | * | 7/1997 | Nakamura et al. .......... 148/321 |
| 5,684,846 A | * | 11/1997 | Meneely et al. ............ 376/293 |
| 5,692,726 A | * | 12/1997 | Adachi et al. .............. 251/368 |
| 5,742,020 A | * | 4/1998 | Adachi et al. ........... 219/78.01 |
| 5,787,853 A | * | 8/1998 | Adachi et al. ........... 123/193.5 |
| 5,874,175 A | * | 2/1999 | Li .............................. 428/457 |
| 6,098,655 A | | 8/2000 | Bloch et al. |
| 6,110,555 A | * | 8/2000 | Katz et al. .................... 428/44 |

FOREIGN PATENT DOCUMENTS

| | | |
|---|---|---|
| GB | 881031 | 1/1961 |
| GB | 1365452 | 9/1974 |

OTHER PUBLICATIONS

Patent Abstracts of Japan, vol. 009, No. 038 (M–358) Feb. 19, 1985 & JP 59 179283A Oct. 11, 1984 Abstract.

* cited by examiner

*Primary Examiner*—Gene Mancene
*Assistant Examiner*—Eric Keasel
(74) *Attorney, Agent, or Firm*—Antonelli, Terry, Stout & Kraus, LLP

(57) ABSTRACT

A valve is characterized by excellent corrosion and wear resistance and maintainability due to use of a bonding corrosion and wear proof alloy containing non-continuously distributed eutectic carbide on the sliding portions of various types of apparatuses and valves by diffusion bonding. This serves to improve the maintainability of a thermal and nuclear power plant and to provide a nuclear power plant using recirculating water, which ensures excellent working safety, in particular. The corrosion and wear proof alloy is characterized in that network-formed eutectic carbide in the alloy containing the cast structure base metal and eutectic carbide is formed into(multiple) granules or lumps having a particle size of 30 microns or less so that said eutectic carbide is non-continuously distributed.

33 Claims, 3 Drawing Sheets

FIG. 1
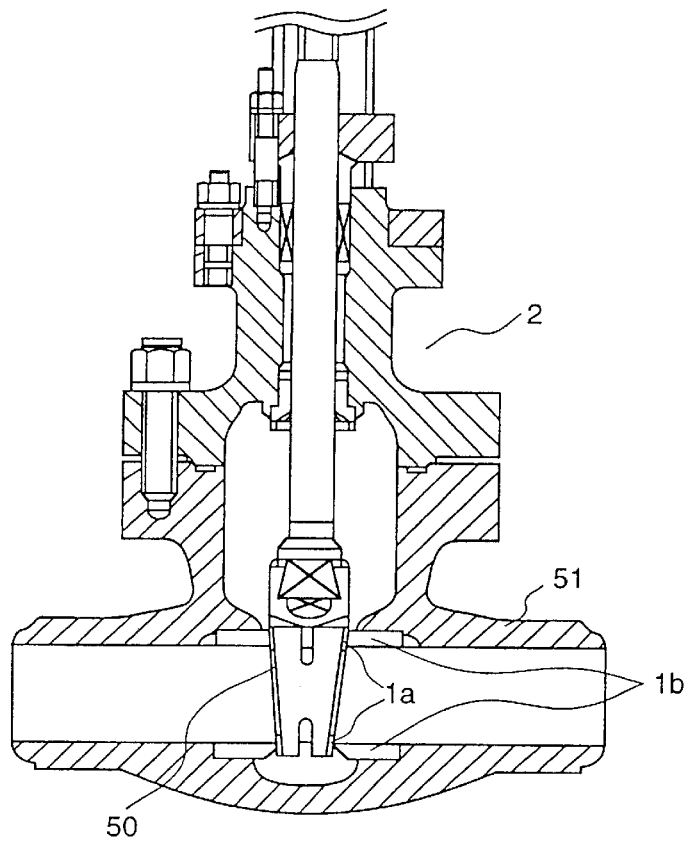
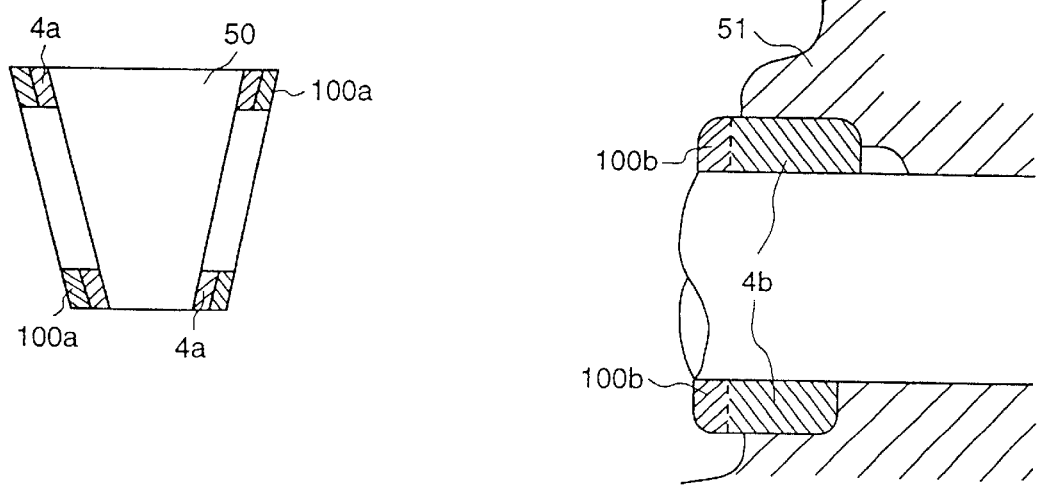
FIG. 1(a)    FIG. 1(b)

VALVE BONDED WITH CORROSION AND WEAR PROOF ALLOY AND APPARATUSES USING SAID VALVE

BACKGROUND OF THE INVENTION

The present invention relates to a valve having a corrosion and wear proof alloy bonded to the sliding portion, and to apparatuses using said valve.

In recent years, chemicals, such as hydrogen peroxide and hydrazine, have come to be injected into the recirculation system of turbine generation facilities in order to adjust the quality of recirculating water. This increases the volume of dissolved oxygen on the downstream side of the inlet where said chemicals are introduced, resulting in damage to the valve seat, etc. due to erosion and scoring.

Official Gazette of Japanese Patent Laid-Open NO. 179283/1984 discloses a valve wherein a valve seat comprising 30 to 45 wt % of Cr, 3.0 to 8.0 wt % of Ti, 0 to 10 wt % of Mo and remaining Ni is diffusion-bonded to the valve disc and valve body.

In such valves as a globe valve, a gate valve and a butterfly valve, alloys of high hardness characterized by excellent corrosion and wear resistance, such as a cobalt (Co) base alloy, a nickel (Ni) base alloy, and an iron (Fe) base alloy, are padded onto the sliding portion of the valve and valve seat in order to avoid damage due to erosion caused by fluid close to the valve seat during operation, or to prevent scoring at the time of valve operation.

However, an eutectic carbide of cobalt (Co) base, nickel (Ni)base or iron (Fe) base alloy and others padded onto the sliding portion and valve seat of the valve, when subjected to steam or hot water, is selectively corroded and damaged. Fluid in the recirculating water system has a high temperature and high speed. After the said damage due to corrosion, the base metal of the cast structure may be separated to cause erosion. (Thermal nuclear power generation, Vol. 30, No.5, P.67 and "Machine damage": 1982 No.2 P.90)

This will lead to reduced leakage resistance of the valve, resulting in failures, such as changes in the controllability and in the operating characteristics. This is accompanied by more frequent inspection and disassembling of the valve, hence leading to poorer plant maintainability.

If the above-described failure occurs to the sliding portion in contact with reactor water and to the valve of the facilities in the system to supply coolant into the reactor in the nuclear power generation facilities, cobalt, nickel or iron alloy of high hardness padded to these positions may be separated and dissolve into the system due to corrosion and erosion.

In the welded overlay alloy comprising a conventional cast structure base metal and eutectic carbide of a network structure, the resistance to corrosion and erosion is not sufficient. To solve these problems, in accordance with the present invention, a corrosion and wear proof alloy with non-continuously distributed eutectic carbide is bonded to the sliding portions of the valve and other parts by diffusion bonding, thereby providing a valve characterized by excellent resistance to corrosion and erosion and superb maintainability.

SUMMARY OF THE INVENTION

The object of the present invention is to improve the corrosion and erosion resistance of the sliding portions and valve seat of valves used in a thermal and nuclear power plant or the like.

The present invention relates to a valve comprising a valve disc and valve body with a valve seat installed on each of the sliding portions of said valve disc and box; said valve being characterized in that the surface of said valve seat is made of a material selected from one of a cobalt base alloy, a nickel base alloy and an iron base alloy, and said alloys have a granular or lumpy eutectic carbide in the matrix having a metallic micro-structure, wherein the particle size of said eutectic carbide does not exceed 30 microns or more preferably 10 microns. The alloy selected from one of a cobalt base alloy, a nickel base alloy and an iron base alloy is preferably bonded to the surface of the valve seat by diffusion bonding, especially by transient liquid phase diffusion bonding.

Resistance to corrosion can be improved by as much as about 300 times by changing the eutectic carbide from a continuous network form to a non-continuous granular or lumpy form having a particle size not exceeding 30 microns. The particle size of the eutectic carbide is preferred to be smaller, and this improves the mechanical characteristics thereof, including ductility, toughness and resistance to impact.

In accordance with this invention, a member comprising a cobalt, nickel or iron base alloy having said granular or lumpy eutectic carbide is bonded on the sliding surface of a valve seat composed of stainless steel, made of carbon steel, low alloy steel or stainless steel.

The cobalt base alloy preferably contains 0.6 to 3 wt %, or more preferably 1.0 to 3 wt %, of C; 2 wt % or less of Si; 25 to 32 wt % of Cr; 15 wt % or less, or more preferably 4 to 15 wt %, of W; 0 to 3 wt % of Fe; 0 to 3 wt % or less of Ni; and 0 to 6 wt % of Mo. The nickel base alloy preferably contains 1 wt % or less, or more preferably 0.2 to 0.5 wt %, of C; 7% wt % or less of Si; 7 to 20 wt % of Cr; 5 wt %, or more preferably 0.5 to 2 wt %, of W; and 3.5 wt % or less of B. The iron base alloy preferably to contain 1.5 wt % or less, or 0.3 to 1.0 wt %, of C; 4 wt % or less, or 0.5 to 5 wt %, of S; 15 to 27 wt % of Cr; and 8 wt % or less, or more preferably 0.5 to 2 wt %, of Mo.

A corrosion and wear proof alloy used in accordance with the invention is typically made by plastic deformation of a base alloy containing an eutectic carbide in a continuous network structure, for example, in order to make the eutectic carbide non-continuous or granular. Preferably, the corrosion and wear proof alloy is bonded to the valve seat by diffusion bonding.

Furthermore, said diffusion bonding is preferred to be transient liquid phase diffusion bonding wherein the insert material having a melting point lower than that of the base metal is inserted into the boundary of bonding, and the melting point lowering element is diffused in the base metal, thereby promoting coagulation and bonding. Said insert material is preferably a nickel base alloy containing 1 to 8 wt % of Si and 1 to 5 wt % of B, or this nickel alloy further containing 5 to 20 wt % of Cr in addition. Particularly, said insert material is preferably a nickel base alloy containing 3 to 6 wt % of Si and 2 to 4 wt % of B, or this nickel base alloy further containing 5 to 10 wt % of Cr in addition. Said base metal is preferably a cobalt base corrosion and wear proof alloy.

The present invention provides a nuclear power plant comprising piping equipment having water feed valves in the recirculating system carrying nuclear reactor coolant water, characterized in that the valve seat of said valve is formed so as to be bonded with the corrosion and wear proof alloy, wherein said eutectic carbide contained in the alloy comprising the cast structure base metal and eutectic carbide is formed into granules and lumps, and said eutectic carbide is non-continuously distributed. It also provides a power plant characterized in that piping equipment using the valve according to the present invention is installed in the recirculating system where coolant water or very hot water recirculates.

As discussed above, the apparatus and valve according to the present invention provides a reliable method of reducing the damage to the sliding portion of the valve or valve seat resulting from damage due to corrosion of the eutectic carbide caused by dissolved oxygen in the fluid, and of avoiding an increase in the frictional resistance on the sliding portion and valve seat and leakage from the valve seat.

Furthermore, the nuclear power plant according to the present invention prolongs the service life of apparatuses and valves in said plant.

The present invention is characterized in that the alloy is composed of Co base alloy, Ni base alloy or Fe base alloy, and a cast structure base metal and eutectic carbide continuously distributed in a network form is subjected to plastic processing by forging or rolling; and, thereby, a eutectic carbide continuously distributed in a network structure is made to be non-continuously distributed through formation of granules or lumps. Thus, the non-continuously distributed corrosion and wear proof alloy is bonded to the sliding portions of various apparatuses and valves by diffusion bonding, especially by transient liquid phase diffusion bonding. This invention controls the increase in frictional drag of the sliding portions of the apparatuses and valves. Especially, this invention controls reduction in leakage resistance due to roughing of the valve seat surface and the like.

The method of converting a eutectic carbide that is continuously distributed in network structure into one that is non-continuously distributed with granules or lumps is exemplified by a method in which an alloy obtained by forging is subjected to plastic formation by forging or rolling and heat treatment (annealing), but the invention is not restricted to such a method.

A corrosion and wear proof alloy with non-continuously distributed eutectic carbide can be bonded to a sliding portion by diffusion bonding, above all, by transient liquid phase diffusion bonding. In transient liquid phase diffusion bonding, the insert material having a melting point lower than that of the base metal (bonded material) is inserted into the boundary of the bonding, and a melting point lowering element such as boron (B), silicon (Si) or phosphorus (P) contained in the insert material at the time of the bonding process is diffused in the base metal. This makes it possible to reduce the bonding weighting at the time of bonding below the level in solidus diffusion bonding, and to reduce the deformation of the base metal (bonded material). Furthermore, the machining accuracy of the bonded surface before the bonding process can be improved to about 40 microns in Rmax, or more preferably 20 microns in Rmax, and satisfactory bonding is obtained.

As a diffusion bonding of a base metal (bonded material) through the transient liquid phase, transient liquid phase diffusion bonding is suitable in that it is superior in the reliability of the bonded portion, such as the bonding strength. For example, the conventional brazing method utilizes chemical bonding and physical adhesion between the brazing filler metal and the base metal, and the mutual diffusion among them is smaller than that in transient liquid phase diffusion bonding.

A welded overlay alloy, such as a Co base, Ni base or Fe base alloy with eutectic carbide continuously distributed in the network structure in the normal state, can be converted into corrosion and wear proof alloy containing non-continuously distributed eutectic carbide when eutectic carbide is formed in granules or lumps. A chemical such as hydrogen peroxide or hydrazine is injected into the recirculating water system. Even if this increases the volume of dissolved oxygen, by diffusion bonding of said corrosion and wear proof alloy to the sliding portions of the valve and apparatus, it is possible to control the corrosion damage of eutectic carbide on the sliding portion of the valve and apparatus present in said system. Furthermore, it also controls an increase in the frictional resistance on the sliding portion and a reduction in leakage resistance due to roughing of the valve seat surface, thereby making it possible to provide a valve and apparatus characterized by outstanding maintainability.

According to the present invention, a Co base, Ni base or Fe base corrosion and wear proof alloy containing eutectic carbide in granules or lumps obtained from sheet or rod material subjected to plastic formation by forging or rolling and heat treatment (annealing) is bonded to the valve seat or the like by diffusion bonding, especially, by transient liquid phase diffusion bonding. This makes it possible to provide safety valves, gate valves, globe valves and other valves characterized by the reduced possibility of damage to the valve seat due to corrosion or erosion caused by dissolved oxygen.

Furthermore, the present invention makes it possible to control scattering or diffusion of cobalt resulting from corrosion, erosion or wear of the Co base alloy used in the valves of nuclear power generation facilities, thereby providing a nuclear power plant characterized by outstanding maintainability.

Conventionally, stellite alloy of high hardness, for example, a Co base alloy containing 1.3 wt % of C, 27.7 wt % of Cr and 4.9 wt % of W has been used on the sliding portion of the valve seat of the valve and apparatus in order to prevent erosion or scoring. They are padded by gas welding or electric arc welding, such as PTA (Plasma Transfer Arc).

In said cobalt base alloy, however, eutectic carbide mainly comprising Cr and C is continuously distributed in the network structure in the cast structure base metal mainly comprising cobalt. As a result of this corrosion or erosion, separation of the cast structure base metal is promoted and caused by corrosion of the eutectic carbide of the network structure by dissolved oxygen.

According to the present invention, an alloy comprising a cast structure base metal and a eutectic carbide continuous in a network form is subjected to the process of plastic formation by forging and rolling, and subsequent heat treatment (annealing) or the process of hot forging or rolling at a high temperature. This allows eutectic carbide to be non-continuously distributed in granules or lumps. Damage due to corrosion of carbide caused by dissolved oxygen is limited to the carbide on the surface in contact with the dissolved oxygen, with the result that separation of the cast structure base metal is controlled.

The above effect can be verified, for example, in the intergranular corrosion test (Strauss test JIS G0575) on the Co base alloy with 1.3 wt % of C, 27.7 wt % of Cr and 4.9 wt % of W containing eutectic carbide in the network structure or eutectic carbide in granules or lumps. When eutectic carbide is formed in granules or lumps, the corrosion depth is reduced down to about 1/300 in the Strauss test, compared to the case where eutectic carbide is formed in the network structure.

BRIEF DESCRIPTION OF THE DRAWINGS

FIG. 1 is a vertical sectional view of a gate valve. and FIGS. 1 (a) and 1 (b) are enlarged sectional views of the valve seat structure;

DESCRIPTION OF THE PREFERRED EMBODIMENTS

Embodiment 1

Figure 2:
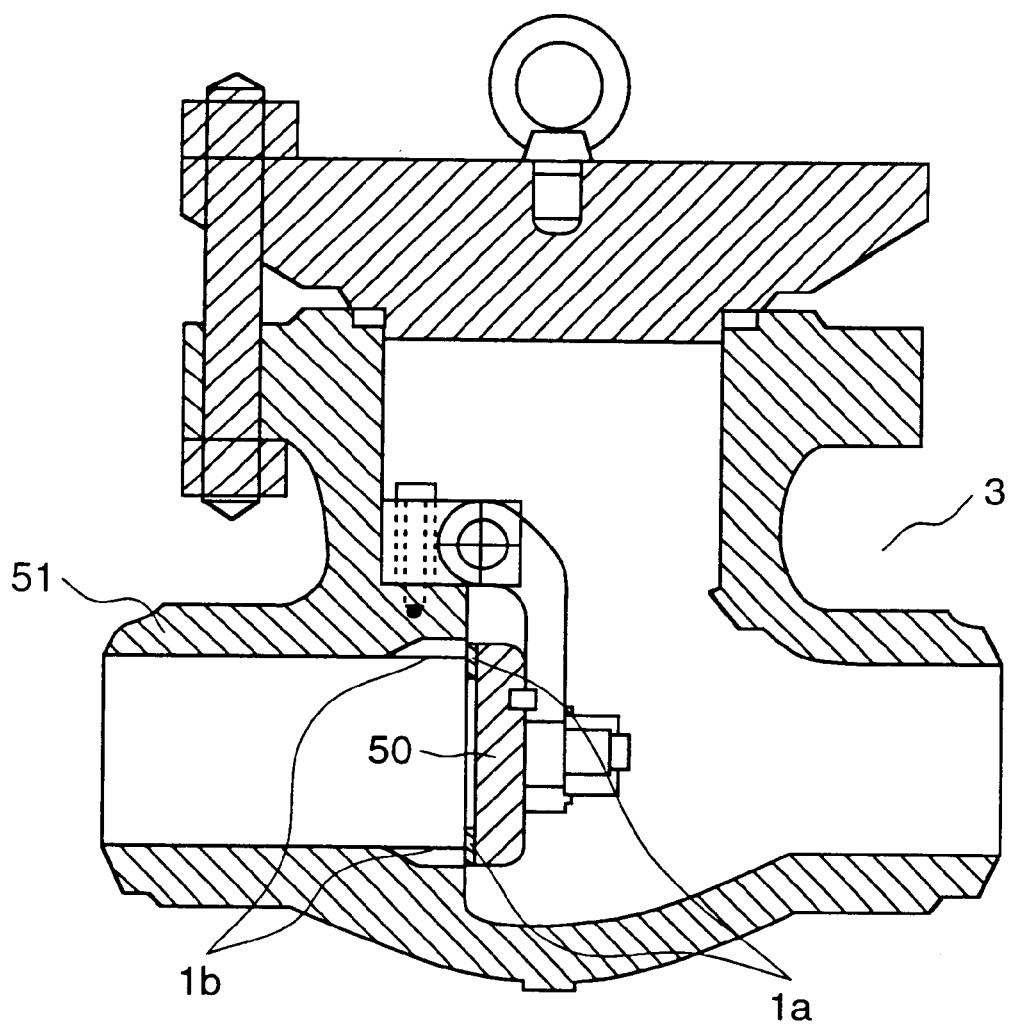
FIG. 2 is a vertical sectional view of a check valve.

In the present embodiment, a corrosion and wear proof cobalt alloy of high hardness containing 1.1 wt % of C, 29.7 wt % of Cr and 4.5 wt % of W is bonded to the valve seat of a gate valve to be used in a dissolved oxygen atmosphere by transient liquid phase diffusion bonding, wherein said corrosion and wear proof cobalt alloy is characterized in that eutectic carbide is made into granules or lumps having a diameter not exceeding 30 microns by hot rolling at the same temperature as hot forging at 1050 to 1100 degrees Celsius.

FIG. 1 is a vertical sectional view of a gate valve composed of casting of SCPH2 (equivalent to S25C). FIG. 1 (a) is an enlarged view of the valve disc, and FIG. 1 (b) is an enlarged view of the valve body.

The valve disc 50 and valve body 51 of a gate valve 2 and the valve seats 4a and 4b were washed. An insert materials was placed on these valve seat surfaces, and said corrosion and wear proof cobalt base alloy sheet, in the form of a 5 mm thick ring sheet with eutectic carbide formed in granules or lumps, was placed on said insert material to carry out transient liquid phase diffusion bonding. Said insert material consisted of a 40 microns thick Ni base alloy containing 4.5 wt % of Si and 3.2 wt % of B. The solidus line temperature and transient liquid phase line temperature thereof are about 980 and 1040 degrees Celsius, respectively.

Transient liquid phase diffusion bonding was carried out at a bonding temperature of 1100 degrees Celsius for a holding time of one hour at a degree of vacuum of $2 \times 10^{-4}$ Torr and a bonding weighting of 80 g/cm². Since melting point lowering elements Si and B are contained therein, the melting point of the insert material is lower than that of the base metal (bonded material). When held at the bonding temperature, Si and B are diffused into the base metal to increase the melting point, so coagulation of the insert material proceeds during the bonding process. In this way, a Co base alloy 100a is bonded on the surface of the valve seat 4a to obtain the valve seat 1a. A Co base alloy 100b is bonded on the surface of the valve seat 4b to obtain the valve seat 1b.

After the bonding process, the cross section of the bonding boundary was observed, and it was found that there were almost no bonding defects, such as voids. Thus, an excellent bonding performance was verified.

For the gate valve manufactured according to the present embodiment, continuous corrosion of eutectic carbide caused by dissolved oxygen is held down, thereby reducing separation of the base metal of the cast structure. This retards the progress of corrosion or erosion of the valve seats 4a and 4b and prevents deterioration of the leakage resistance.

Brazing is one of the methods for bonding a base metal (bonded material) through the transient liquid phase. When brazing is used, the brazing filler material is mainly in the transient liquid phase even in the completion of heating at the bonding temperature. The mutual diffusion between the brazing filler material and the base metal is smaller than the mutual diffusion between the insert material and the base metal in transient liquid phase diffusion bonding. The reliability of the bonded portion, such as the bonding strength, is inferior to that of transient liquid phase diffusion bonding.

Embodiment 2

In Embodiment 2, a corrosion and wear proof cobalt base alloy of high hardness containing 1.1 wt % of C, 29.7 wt % of Cr and 4.5 wt % of W is bonded to the valve seat of a check valve 3 to be used in a dissolved oxygen atmosphere by transient liquid phase diffusion bonding, wherein said corrosion and wear proof cobalt base alloy is characterized in that eutectic carbide is formed in granules or lumps by hot forging at 1050 to 1100 degrees Celsius. In this way, valve seats 1a and 1b were manufactured.

FIG. 2 is a vertical sectional view of a check valve.

The insert material used for bonding is Ni base alloy containing 7 wt % of Cr, 3 wt % of Fe, 4.5 wt % of Si and 3.2 wt % of B, and the solidus line temperature and the transient liquid phase line temperature are about 970 and about 1000 degrees Celsius, respectively. Transient liquid phase diffusion bonding is carried out at the bonding temperature of 1090 degrees Celsius for the holding time of one hour at a degree of vacuum of $2 \times 10^{-4}$ Torr and bonding weighting of 50 g/cm².

After bonding, the cross section of the bonding boundary was observed, and it was found that there were almost no bonding defects such as voids. Thus, an excellent bonding performance was verified.

Furthermore, for the check valve manufactured according to the present embodiment, continuous corrosion of eutectic carbide caused by dissolved oxygen is held down, thereby reducing separation of the base metal of the cast structure. This retards the corrosion or erosion of the valve seats 1a and 1b and prevents deterioration of the leakage resistance.

In Embodiments 1 and 2, a Ni base alloy of lower melting point was used as the insert material. It is also possible to use a Fe base or Co base alloy of lower melting point, instead. Furthermore, the insert material preferably contains Cr, which is effective for corrosion resistance, as shown by Embodiment 2. This makes it possible to maintain the corrosion resistance of the bonded portion, especially the corrosion resistance of the bonded portion subjected to a steam atmosphere of high temperature and bonding weighting with a great deal of dissolved oxygen.

Figure 3:
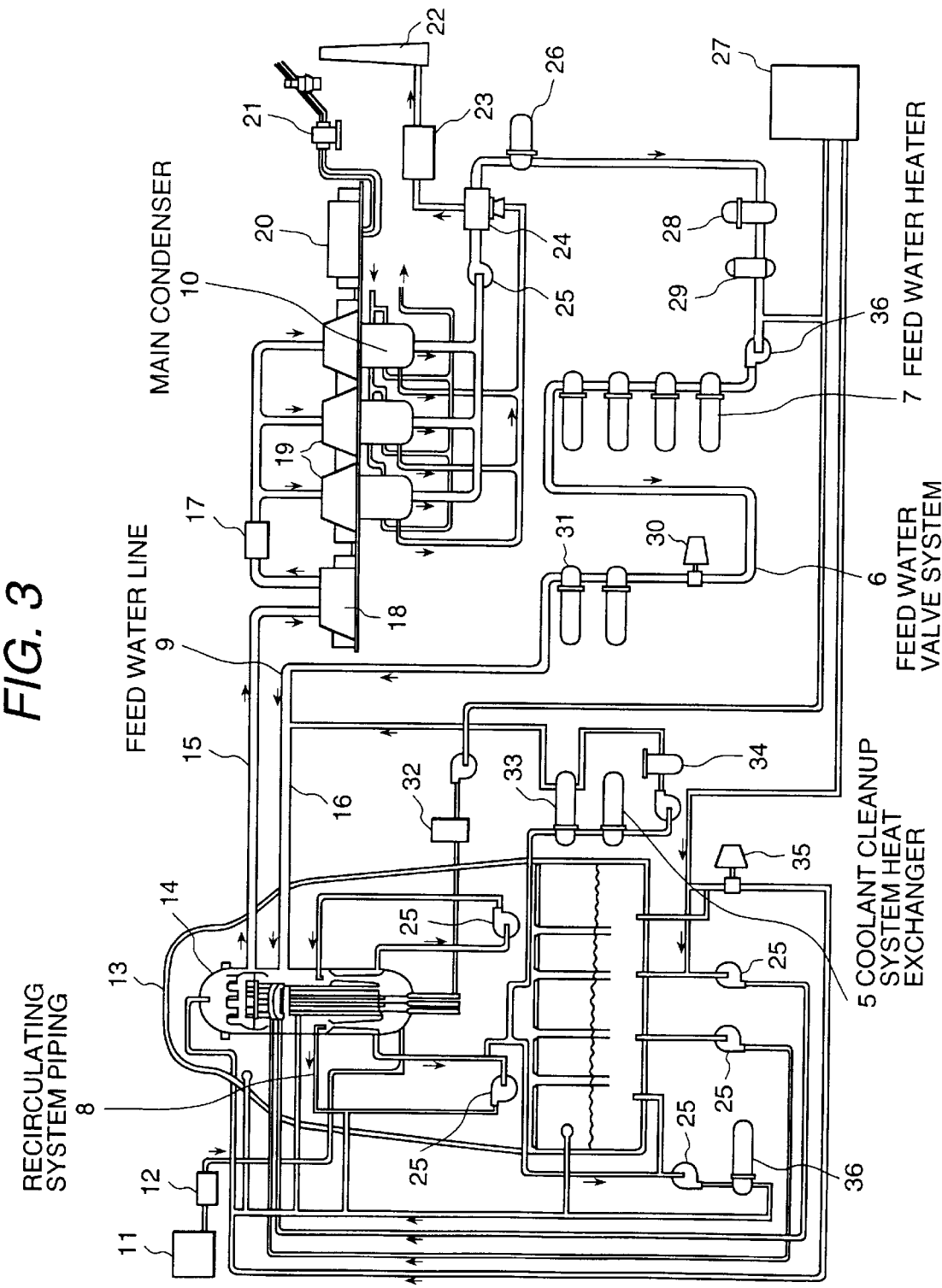
FIG. 3 is a piping system diagram of a nuclear power plant in which the valve according to the present invention is used in a feed water system.

FIG. 3 shows an example of the piping system of a nuclear power plant where the valve according to the present invention is used in the primary coolant recirculating system.

A great number of valves according to the present invention are present in the piping of the primary coolant recirculating system, and all of these valves are not illustrated.

In the nuclear power plant, coolant is heated by nuclear reactor bonding weighting vessel 14 to become steam of high temperature and bonding weighting, and the steam is led into the high bonding weighting turbine 18 through main steam line 15. Then, steam discharged from the high bonding weighting turbine 18 is led to low bonding weighting turbine 19 to the drive generator 20. After passing through the main condenser 10, steam discharged from the high bonding weighting turbine 18 and low bonding weighting turbine 19 is fed by the feed water valve system 6, equipped with many valves according to the present invention, so as to pass through the feed water pump 30 and high bonding weighting feed water heater 31, and then through the feed water line 9. Then, it is condensed in the nuclear reactor bonding weighting vessel 14.

As seen in FIG. 3 the system includes a coolant cleanup system heat exchanger 5, a feed water heater 7, recirculating system piping 8a, a main condenser 10, an SLC tank 11 for a boric acid spray system, an SLC pump 12, a fuel containment vessel 13, a feed water line 16, a humidity analyzer 17, a main transformer 21, a stack 22, an offgas disposal system 23, an air ejector 24, a low bonding weighting condensate pump 25, a condensate storage tank 27, a condensate filter 28, a condensate demineralizer (CD) 29, a control rod drive system 32, a heat exchanger 33, a filter demineralizing facility 34, a reactor core isolation cooling system 35, and a high bonding weighting condensation pump 36.

The present invention is effective in prolonging the service life of the apparatus and valve in the nuclear power generation plant. The method according to the present invention reduces deterioration in leakage resistance, controllability and operation performances when applied to the sliding portion of the valve seats of the safety valve and globe valve, in addition to said gate valve and check valve.

Combined use of the above valves reduces corrosion or erosion on the sliding portions of the valve seats and other portions of valves caused by the influence of dissolved oxygen by injection of hydrogen peroxide performed for water quality adjustment in plant equipment, such as turbine generation facilities. This is effective in improving the safety of plant facilities, such as turbine generation facilities.

Especially in nuclear power generation facilities, the present invention provides a nuclear power generation plant characterized in that it is possible to reduce corrosion and separation of eutectic carbide of a cobalt base alloy on the sliding portion in contact with reactor water and the valve seat, the case or the like of the valve in the system facilities to feed coolant into the reactor, and to reduce accompanying discharge and diffusion of cobalt of the eutectic carbide into the system. Said nuclear power generation plant is further characterized in that it is possible to reduce the separation of cast structure base metal mainly composed of cobalt, wherein the erosion resistance is deteriorated by corrosion and separation of eutectic carbide.

What is claimed is:

1. A valve comprising a valve disc, a valve body and a valve seat installed on each of sliding portions of said valve disc and said valve body;
   said valve characterized in that a surface of each of said valve seats is made of a sheet material made of an alloy selected from the group consisting of a cobalt base alloy containing 0.6 to 3 wt.% of C, 2 wt % or less of Si, 25 to 32 wt % of Cr, 15 wt % or less of W, 3 wt % or less of Fe, 3 wt % or less of Ni, and 6 wt % or less of Mo, a nickel base alloy containing 1 wt % or less of C, 7 wt % or less of Si, 7 to 20 wt % of Cr, 5 wt % or less of W, and 3.5 wt % or less of B, and an iron base alloy containing 1.5 wt % or less of C, 4 wt % or less of Si, 15 to 27 wt % of Cr, and 8 wt % or less of Mo, and said alloy has a granular or lumpy eutectic carbide in a matrix having a metallic micro-structure wherein the particle size of said eutectic carbide does not exceed 30 microns.

2. A valve according to claim 1, wherein said sheet material is made of said cobalt base alloy.

3. A valve according to claim 1, wherein said sheet material is made of said nickel base alloy.

4. A valve according to claim 1, wherein said sheet material is made of said iron base alloy.

5. A valve according to claim 1, wherein the particle size of said eutectic carbide does not exceed 10 microns.

6. A valve according to claim 1, wherein said alloy having the granular or lumpy eutectic carbide in the matrix having a metallic micro-structure is made by plastic deformation of a base alloy containing the eutectic carbide in a continuous network structure to make the eutectic carbide granular or lumpy.

7. A power plant comprising piping equipment installed in a recirculating system where steam or hot water is circulating, said power plant characterized in that said valve according to claim 1 is provided in said piping equipment.

8. A power plant according to claim 7, wherein said sheet material is made of said cobalt base alloy.

9. A power plant according to claim 7, wherein said sheet material is made of said nickel base alloy.

10. A power plant according to claim 7, wherein said sheet material is made of said iron base alloy.

11. A power plant according to claim 7, wherein the particle size of said eutectic carbide does not exceed 10 microns.

12. A power plant according to claim 7, wherein said alloy having the granular or lumpy eutectic carbide in the matrix having a metallic micro-structure is made by plastic deformation of a base alloy containing the eutectic carbide in a continuous network structure to make the eutectic carbide granular or lumpy.

13. A nuclear power plant comprising piping equipment installed in a recirculating system where the coolant of a nuclear reactor is circulating, said nuclear power plant characterized in that said valve according to claim 1 is provided in said piping equipment.

14. A nuclear power plant according to claim 13, wherein said sheet material is made of said cobalt base alloy.

15. A nuclear power plant according to claim 13, wherein said sheet material is made of said nickel base alloy.

16. A nuclear power plant according to claim 13, wherein said sheet material is made of said iron base alloy.

17. A nuclear power plant according to claim 13, wherein the particle size of said eutectic carbide does not exceed 10 microns.

18. A nuclear power plant according to claim 13, wherein said alloy having the granular or lumpy eutectic carbide in the matrix having a metallic micro-structure is made by plastic deformation of a base alloy containing the eutectic carbide in a continuous network structure to make the eutectic carbide granular or lumpy.

19. A valve according to claim 1, wherein said sheet material is bonded to a base metal of said valve seat.

20. A valve according to claim 19, wherein said sheet material is bonded to the base metal of the valve seat by diffusion bonding.

21. A valve according to claim 20, wherein said sheet material is bonded to the base metal of the valve seat by transient liquid phase diffusion bonding.

22. A power plant comprising piping equipment installed in a recirculating system where steam or hot water is circulating;
   said power plant characterized in that said valve according to claim 21 is provided in said piping equipment.

23. A power plant according to claim 22, wherein said sheet material is made of said cobalt base alloy.

24. A power plant according to claim 22, wherein said sheet material is made of said nickel base alloy.

25. A power plant according to claim 22, wherein said sheet material is made of said iron base alloy.

26. A power plant according to claim 22, wherein the particle size of said eutectic carbide does not exceed 10 microns.

27. A power plant according to claim 22, wherein said alloy having the granular or lumpy eutectic carbide in the matrix having a metallic microstructure is made by plastic deformation of a base alloy containing the eutectic carbide in a continuous network structure to make the eutectic carbide granular or lumpy.

28. A nuclear power plant comprising piping equipment installed in a recirculating system where the coolant of a nuclear reactor is circulating, said nuclear power plant characterized in that said valve according to claim 21 is provided in said piping equipment.

29. A nuclear power plant according to claim 28, wherein said sheet material is made of said cobalt base alloy.

30. A nuclear power plant according to claim 28, wherein said sheet material is made of said nickel base alloy.

31. A nuclear power plant according to claim 28, wherein said sheet material is made of said iron base alloy.

32. A nuclear power plant according to claim 28, wherein the particle size of said eutectic carbide does not exceed 10 microns.

33. A nuclear power plant according to claim 28, wherein said alloy having the granular or lumpy eutectic carbide in the matrix having a metallic micro-structure is made by plastic deformation of a base alloy containing the eutectic carbide in a continuous network structure to make the eutectic carbide granular or lumpy.

\* \* \* \* \*